R. P. FLINN.
VALVE FOR INTERNAL COMBUSTION ENGINES.
APPLICATION FILED AUG. 16, 1913.
1,123,863.
Patented Jan. 5, 1915
Fig. 1.
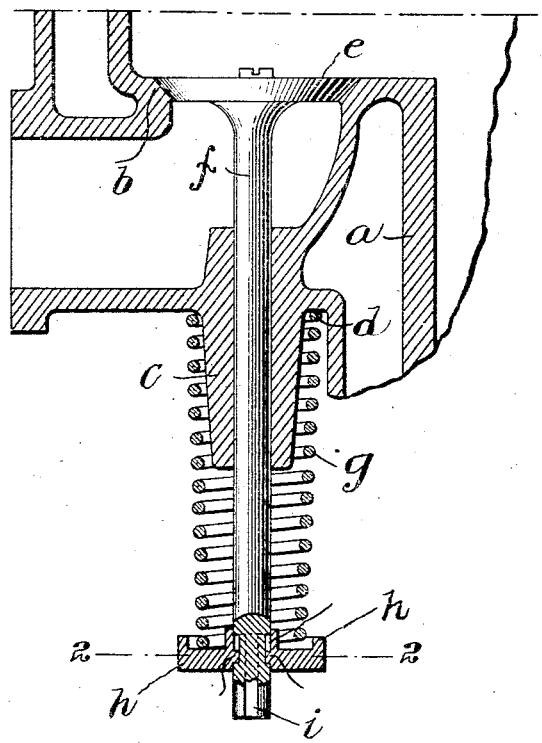
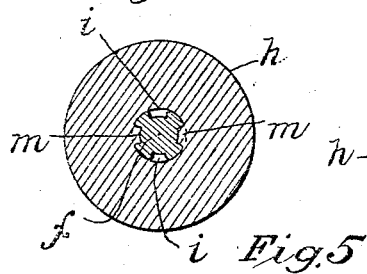
Fig. 2.
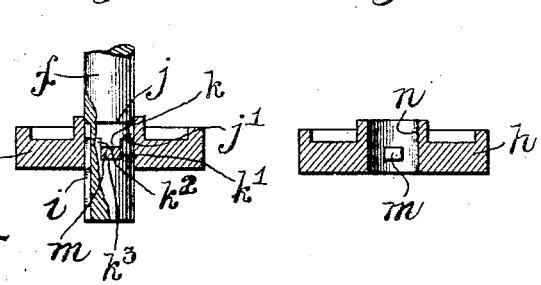
Fig. 3.
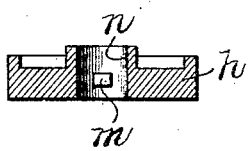
Fig. 4.
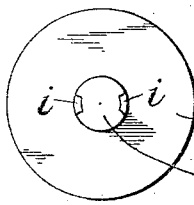
Fig. 5.
Attest:
Richard P. Flinn Inventor:
by Frank T. Wentworth
his Atty

UNITED STATES PATENT OFFICE.

RICHARD P. FLINN, OF NEW YORK, N. Y.

VALVE FOR INTERNAL-COMBUSTION ENGINES.

1,123,863.    Specification of Letters Patent.    Patented Jan. 5, 1915.

Application filed August 16, 1913. Serial No. 735,075.

*To all whom it may concern:*

Be it known that I, RICHARD P. FLINN, a citizen of the United States, residing at the borough of Brooklyn, in the city of New York, county of Kings, and State of New York, have invented certain new and useful Improvements in Valves for Internal-Combustion Engines, of which the following is a specification, reference being had therein to the accompanying drawings, which form a part thereof.

My invention relates to valves for internal combustion engines, and more particularly to means for facilitating the setting and removal of a spring seated puppet valve and parts appurtenant thereto.

In internal combustion engines commonly used upon automobiles and motor boats, the valve mechanism is of small dimensions, and not readily accessible. The valve stem is reciprocated by an impact rod engaging the lower end thereof, and high frequency in the actuation of the valve causes it to wear rapidly and subjects it to constant vibration.

It is the common practice in valves of the type to which my invention relates, to provide a coiled valve spring encircling the valve stem, one end of said spring being seated about the valve bearing on the cylinder head, and the other end in a cup carried by the valve stem itself, the spring being normally held under compression by said spring cup which is necessarily removable from the stem to permit the assembling of the valve mechanism and the tensioning of the spring when so assembling. Heretofore it has been the usual practice to mount the spring cup upon the valve stem by means of a cotter pin passing through the stem below the cup, although in some instances the stem and spring cup have been provided with coöperating screw threads. Owing to the inaccessibility of this valve mechanism, the small working space about the valve mechanism, and the pressure of the spring against its seat, I have, in practice, found it very difficult to remove and replace the cotter pin, to permit the removal of the valve, or to restore said pin when resetting the valve. The same difficulties are encountered when screw threads are used. The vibrations of the valve mechanism also have a tendency to loosen the cotter pin, or cause the spring cup to work loose when screw threads are used.

With the construction above referred to, the removal and resetting of a valve stem is difficult and requires considerable time.

With these conditions in mind, the main object of my invention is to provide a valve for internal combustion engines wherein the stem will have slidably and rotatably mounted thereon a spring cup adapted to hold the spring normally in compression, said valve stem and said spring cup being provided with interlocking means so arranged as to cause that normal tendency of the spring to expand to prevent such displacement of the cup as would result in its turning or sliding upon the stem, while permitting a quick and convenien disengagement of said interlocking means to facilitate the removal of the valve stem.

A further object is to provide a valve wherein the spring cup may be applied to the stem by a movement axially thereof thus permitting the compression of the spring by the cup during this sliding movement thereof, the interlocking means carried by the cup and the stem being adapted to hold the spring against expansion with the slightest rotary movement of the cup and prior to the full operative engagement of said interlocking means.

A still further object is to provide a valve wherein the spring may be compressed by a direct sliding movement of the spring cup axially of the valve stem, and the interlocking means are brought into the operative relation through a partial rotation of said cup, the expansion of the spring automatically causing such an engagement of the interlocking means as to prevent disengagement thereof except upon a compression of said spring. And a still further object is to provide a valve wherein the means securing the spring cup upon the valve stem will form a part of, and be removable with, the spring cup, and be capable of disengagement from the stem through a partial rotation of the cup, thus permitting the valve to be removed and reset without requiring the removal or use of any part but the spring cup itself.

The invention consists primarily in a valve for internal combustion engines embodying therein a reciprocatory valve stem, a valve block carried by and movable therewith, a spring encircling said stem, one end of said spring being adapted to seat adjacent the bearing for said stem, a spring cup slidably and rotatably mounted upon said stem, means on said stem for controlling and defining the movement of said cup upon said stem, and means carried by and movable with said cup and coöperating with said last named means, and adapted to interlock therewith, whereby said cup may be mounted upon said stem by a movement axially thereof, and be locked in position by a partial rotation thereof; and in such other novel features of construction and combination of parts as are hereinafter set forth and described, and more particularly pointed out in the claims hereto appended.

Referring to the drawings: Figure 1 is a sectional view of a portion of a cylinder head showing my improved valve applied thereto; Fig. 2 is a section on the line 2—2 of Fig. 1; Fig. 3 is a detail view in elevation of the lower portion of the stem, illustrating the construction by which the spring cup is mounted upon said stem; Fig. 4 is a sectional view of the spring cup removed from the stem; and Fig. 5 is a bottom view of the stem with the spring cup in position to slide thereon.

Like letters refer to like parts throughout the several views.

In the embodiment of my invention shown in the drawings, $a$ indicates a portion of the cylinder head provided with a valve seat $b$ and a bearing boss $c$ about which is formed a spring seat as $d$. Coöperating with the valve seat $b$ is an ordinary puppet valve block $e$, provided with a stem $f$ adapted to reciprocate in the bearing $c$. Encircling the valve stem $f$ and the bearing boss $c$, with one end thereof bearing upon the seat $d$, is a coil spring $g$ which is normally placed under compression by a spring cup $h$, mounted upon and movable with the valve stem $f$. When the valve is assembled, the spring $h$ has a normal tendency to expand and seat the valve, the valve stem $f$ receiving a timely reciprocation from an eccentric rod, not shown, to open said valve against the tension of said spring. The construction heretofore described is old and well known in this art, and I make no claim of invention thereto, as my invention relates to the particular manner of combining and assembling these parts to facilitate the mounting or removal of the cup $h$ upon, or from, said stem $f$, with the objects above specified.

To permit a quick and convenient mounting of the spring cup $h$ upon the stem $f$, it is necessary that said cup be adapted to slide axially of said stem while holding the tension of the spring and further compressing same, and when the cup reaches the desired position on the stem, to rotate slightly upon said stem to hold the compression of the spring so as to permit a slight further rotation of the cup while the expansive force of the spring is being held by the stem itself, to bring the interlocking means carried by the cup and the stem into the operative relation and cause the cup to move axially of the stem under said spring to engage said interlocking means to prevent further movement of the cup except by and in accordance with the movements of the valve stem. To permit the desired movement of the spring cup $h$, I provide the stem $f$ with means adapted to control and define the movements of said spring cup, which means comprises the axially extending grooves $i$, preferably two in number, arranged at diametrically opposite points on said stem $f$, which grooves are open at the end of said stem and terminate in a circumferential channel $j$, extending about said stem.

Extending from the channel $j$ toward the end of the stem $f$, are the diametrically opposed recesses $k$, forming the bearing surfaces $k'$, $k^2$ and $k^3$, adapted to be engaged by coöperating means carried by the spring cup $g$ to prevent reciprocatory movement or rotation of the said cup when the valve is assembled. Preferably I form two recesses $k$, arranged midway between the grooves $i$ so as to secure the desired strength of material. The upper shoulder of the circumferential channel $j$ serves as a stop to insure the proper positioning of the cooperating means carried by the cup $g$ while the lower shoulder $j'$ of the channel $j$ acts as a bearing adapted to hold the tension of the spring upon a slight return movement of the cup so as to permit the further partial rotation thereof while the valve stem is preventing expansion of said spring.

The coöperating means above referred to, carried by the spring cup $h$ comprises the diametrically opposite tongues $m$, carried upon the inner face of the bore $n$ of said spring cup, which tongues are adapted to have a sliding fit with the grooves $i$, channel $j$ and recesses $k$ respectively.

The operation of the herein described valve is substantially as follows: In assembling the device, the valve stem is inserted in its bearing in the boss $c$, and the valve block $d$ is permitted to seat upon its seat $b$. The spring $g$ is then mounted about the stem $f$ and the cup $h$ brought below the valve stem with the tongues $m$ alined with the grooves $i$. The said cup is then forced axially of said stem $f$, the tongues $m$ guiding and defining its movement through their engagement with the grooves $i$, at the same time steadying the cup. When said tongues $m$ contact with the upper shoulder of the channel $j$, the compression of the spring will be great, and to facilitate the locking of the cup in position, it is first turned slightly so that the tongues $m$ will come to rest upon the shoulder $j'$ intermediate the grooves $i$ and a recess $k$, thus transmitting the expansive force of the spring directly to the stem $f$. Thereafter, it is merely necessary to give a partial rotation to the cup $h$, the spring $g$, immediately upon the tongues $m$ coming to register with the recesses $k$, forcing the cup downwardly and axially of the stem $f$, so as to seat said tongues in said recesses, and in engagement with the bearing surfaces $k'$, $k^2$ and $k^3$ thereof, thus checking further axial movement of the cup and locking it against possible rotary movement. The device having been thus assembled, the normal tendency of the spring $g$ to expand will always hold the interlocking members comprising the tongues $m$ and the bearing surfaces formed by the recesses $k$ in the operative relation, a reciprocatory movement of the valve stem, whether against or under the tension of the spring $g$, having no tendency to disturb the operative relation of said interlocking means. When it is desired to remove the valve, the cup $h$ is raised slightly so as to bring the tongues into register with the channel $j$, this movement being against the tension of the spring $g$. The cup is then turned slightly so as to bring the tongues $m$ into engagement with a shoulder $j'$, thus permitting the further rotation of the cup while the springs are held in compression by the stem $f$. When the tongues $m$ register with the grooves $i$, the spring will force said cup axially of the item $f$ until it is in position to be disengated therefrom, thus freeing the valve stem and permitting the removal of the valve.

It will be observed that the attachment and removal of the spring cup $h$ requires the use of no parts not carried by and forming a permanent part of the valve stem or the spring cup, and that a quarter turn of the cup upon the stem is all that is required to bring the interlocking means carried thereby and by the stem into the operative relation, or bring the cup into a position where it may be removed from the stem. This condition permits the cup to be quickly and conveniently removed from the valve stem in even the most constricted spaces, while the means for attaching the cup to the stem are such as to prevent any possibility of a disengagement of the coöperating parts through the vibration incidental to the actuation of the valve at even the highest speed.

It is not my intention to limit the invention to the precise details of construction shown in the accompanying drawings, it being apparent that the design of the valve stem and cup may be varied without departing from the spirit and scope of the invention.

Having described my invention, what I claim as new and desire to have protected by Letters Patent, is:—

1. A valve for internal combustion engines, embodying therein a reciprocatory valve stem, a valve block carried by and movable therewith, a spring encircling said stem, one end of said spring being adapted to seat adjacent the bearing for said stem, a spring cup slidably and rotatably mounted upon said stem, means on said stem for controlling and defining the movement of said cup upon said stem, and means carried by and movable with said cup and coöperating with said last named means, and adapted to interlock therewith, whereby said cup may be mounted upon said stem by a movement axially thereof, and be locked in position upon a partial rotation thereof.

2. A valve for internal combustion engines, embodying therein a reciprocatory valve stem, a valve block carried by and movable therewith, a spring encircling said stem, one end of said spring being adapted to seat adjacent the bearing for said stem, a spring cup slidably and rotatably mounted upon said stem, said stem having therein a groove extending axially, and opening at the end, thereof, a recess spaced away from said groove, a channel extending circumferentially about said stem and leading into said groove and the top of said recess, and a tongue carried by said spring cup adapted to have movement in said groove and in said channel, and to seat in said recess, whereby the movements of said cup are defined by said groove and said channel, and said cup is held against movement by the shoulders about said recess, and the tension of the spring will be held by said stem during said rotary movement of said cup and will act to prevent the disengagement of said tongue from said recess.

3. A valve for internal combustion engines, embodying therein a reciprocatory valve stem, a valve block carried by and movable therewith, a spring encircling said stem, one end of said spring being adapted to seat adjacent the bearing for said stem, a spring cup slidably and rotatably mounted upon said stem, said stem having therein diametrically opposite grooves extending axially, and opening at the end, thereof, diametrically opposite recesses spaced away from said grooves, a channel extending circumferentially about said stem and leading into said grooves and the tops of said recesses, and diametrically opposite tongues carried by said spring cup adapted to have movement in said grooves respectively and in said channel, and to seat in said recesses respectively, whereby the movements of said cup are defined by said grooves and said channel, and said cup is held against movement by the shoulders about said recesses, and the tension of the spring will be held by said stem during said rotary movement of said cup and will act to prevent the disengagement of said tongues from said recesses.

4. A valve for internal combustion engines, embodying therein a reciprocatory valve stem, a valve block carried by and movable therewith, a spring encircling said stem, one end of said spring being adapted to seat adjacent the bearing for said stem, a spring cup slidably and rotatably mounted upon said stem, said stem having therein diametrically opposite grooves, extending axially, and opening at the end thereof, diametrically opposite recesses spaced away from said grooves, a channel extending circumferentially and entirely about said stem and leading into said grooves and the tops of said recesses, and diametrically opposite tongues carried by said spring cup adapted to have movement in said grooves respectively and in said channel, and to seat in said recesses respectively, whereby the movements of said cup are defined by said grooves and said channel, and said cup is held against movement by the shoulders about said recesses, and the tension of the spring will be held by said stem during said rotary movement of said cup and will act to prevent the disengagement of said tongues from said recesses.

In witness whereof, I have hereunto affixed my signature, in the presence of two subscribing witnesses, this 15th day of August, 1913.

RICHARD P. FLINN.

Witnesses:
  FRANK T. WENTWORTH,
  EUGENE WENING.